(12) United States Patent
Yang (10) Patent No.: US 11,563,879 B2
(45) Date of Patent: Jan. 24, 2023

(54) IMAGE SHOOTING APPARATUS AND MOBILE TERMINAL

(71) Applicant: VIVO MOBILE COMMUNICATION CO., LTD., Guangdong (CN)

(72) Inventor: Wenchang Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/098,023

(22) Filed: Nov. 13, 2020

(65) Prior Publication Data

US 2021/0067675 A1 Mar. 4, 2021

Related U.S. Application Data

(63) Continuation of application No. PCT/CN2019/086130, filed on May 9, 2019.

(30) Foreign Application Priority Data

May 15, 2018 (CN) .......................... 201810460828.3

(51) Int. Cl.
*H04N 5/225* (2006.01)
*H04N 5/232* (2006.01)
*H04B 1/3827* (2015.01)

(52) U.S. Cl.
CPC ......... *H04N 5/2258* (2013.01); *H04N 5/2253* (2013.01); *H04N 5/2254* (2013.01); *H04N 5/23212* (2013.01); *H04B 1/3827* (2013.01)

(58) Field of Classification Search
CPC .. H04N 5/2258; H04N 5/2253; H04N 5/2254; H04N 5/23212; H04N 5/2251; H04B 1/3827; H04M 1/0264
See application file for complete search history.

(56) References Cited

U.S. PATENT DOCUMENTS 5,883,663 A * 3/1999 Siwko .................... H04N 7/181
348/87
9,151,665 B1 10/2015 Lewkow
(Continued)

FOREIGN PATENT DOCUMENTS

CN 102802347 A * 11/2012
CN 104363320 A 2/2015
(Continued)

OTHER PUBLICATIONS

EP Search Report in Application No. 19802917.5 dated May 4, 2021.
(Continued)

*Primary Examiner* — Quan Pham
(74) *Attorney, Agent, or Firm* — Maschoff Brennan (57) ABSTRACT

This disclosure provides an image shooting apparatus and a mobile terminal. The image shooting apparatus includes: a support base, an image shooting circuit board, a first image shooting assembly, and a second image shooting assembly. The support base is provided with an accommodating chamber. The image shooting circuit board is disposed in the accommodating chamber, and divides the accommodating chamber into a first accommodating chamber and a second accommodating chamber. The first image shooting assembly is disposed in the first accommodating chamber, and the second image shooting assembly is disposed in the second accommodating chamber. The first image shooting assembly includes a first lens and a first image sensor. The second image shooting assembly includes a second lens and a second image sensor.

6 Claims, 6 Drawing Sheets

(56) References Cited

U.S. PATENT DOCUMENTS

| | | | |
|---|---|---|---|
| 2006/0126310 A1* | 6/2006 | Watanabe | G06F 1/203 |
| | | | 361/720 |
| 2009/0219435 A1* | 9/2009 | Yuan | H04N 5/2254 |
| | | | 348/360 |
| 2013/0168148 A1* | 7/2013 | Kanai | H05K 3/4638 |
| | | | 156/247 |
| 2014/0218573 A1* | 8/2014 | Hagiwara | H01L 27/14636 |
| | | | 348/294 |
| 2016/0127621 A1 | 5/2016 | Liao | |
| 2018/0020160 A1 | 1/2018 | Lin et al. | |
| 2021/0067675 A1 | 3/2021 | Yang | |
| 2021/0208359 A1* | 7/2021 | Kim | H04N 5/2254 |

FOREIGN PATENT DOCUMENTS

| | | |
|---|---|---|
| CN | 204598057 U | 8/2015 |
| CN | 205195783 U | 4/2016 |
| CN | 106161885 A | 11/2016 |
| CN | 107241473 A | 10/2017 |
| CN | 107426477 A | 12/2017 |
| CN | 108632412 A | 10/2018 |
| KR | 100730765 B1 | 6/2007 |

OTHER PUBLICATIONS

CN Search Report in Application No. 201810460828.3 dated Nov. 20, 2018.
Written Opinion and International Search Report in Application No. PCT/CN2019/086130 dated Nov. 26, 2020.

* cited by examiner

IMAGE SHOOTING APPARATUS AND MOBILE TERMINAL

CROSS-REFERENCE TO RELATED APPLICATIONS

This application is a continuation application of International Application No. PCT/CN2019/086130 filed on May 9, 2019, which claims priority to Chinese Patent Application No. 201810460828.3, filed in China on May 15, 2018, both disclosures of which are incorporated herein by reference in their entireties.

TECHNICAL FIELD

Embodiments of this disclosure relate to the field of communications technologies, and in particular, to an image shooting apparatus and a mobile terminal.

BACKGROUND

With the development of mobile communication technologies, mobile terminals such as smartphones and tablet computers have become an indispensable tool in people's daily lives. People have increasingly higher requirements for mobile terminals, particularly an image shooting function of mobile terminals. An existing mobile terminal is generally provided with a front-facing camera and a rear-facing camera. The front-facing camera is mainly used in special scenes such as taking a selfie or shooting a video with another person. The rear-facing camera is mainly used in scenes other than the foregoing special scenes, so as to satisfy requirements of people for the mobile terminal to shoot in different usage scenes, and make shooting more convenient and improve shooting quality.

However, at present, to install a front-facing camera and a rear-facing camera in a mobile terminal, it is generally necessary to provide mounting holes at two different locations on a main circuit board of the mobile terminal. As a result, the front-facing camera and the rear-facing camera occupy a large installation clearance, which affects installation of other parts in the mobile terminal. A problem may be seen that a large installation clearance is occupied when a front-facing camera and a rear-facing camera are installed in the existing mobile terminal.

SUMMARY

Embodiments of this disclosure provide an image shooting apparatus and a mobile terminal to solve the problem that a large installation clearance is occupied when a front-facing camera and a rear-facing camera are installed in an existing mobile terminal.

To resolve the foregoing technical problem, this disclosure is implemented as follows.

According to a first aspect, an embodiment of this disclosure provides an image shooting apparatus, including a support base, an image shooting circuit board, a first image shooting assembly, and a second image shooting assembly. The support base is provided with an accommodating chamber. The image shooting circuit board is disposed in the accommodating chamber, and the image shooting circuit board divides the accommodating chamber into a first accommodating chamber and a second accommodating chamber. The first image shooting assembly is disposed in the first accommodating chamber, and the second image shooting assembly is disposed in the second accommodating chamber.

The first image shooting assembly includes a first lens and a first image sensor, where the first image sensor is attached to a first side of the image shooting circuit board, and the first image sensor receives an incident light passing through the first lens for imaging.

The second image shooting assembly includes a second lens and a second image sensor, where the second image sensor is attached to a second side of the image shooting circuit board, the second side opposite to the first side, and the second image sensor receives an incident light passing through the second lens for imaging.

According to a second aspect, an embodiment of this disclosure further provides a mobile terminal, including the foregoing image shooting apparatus.

The image shooting apparatus according to this embodiment of this disclosure includes: a support base, an image shooting circuit board, a first image shooting assembly, and a second image shooting assembly. The support base is provided with an accommodating chamber. The image shooting circuit board is disposed in the accommodating chamber, and the image shooting circuit board divides the accommodating chamber into a first accommodating chamber and a second accommodating chamber. The first image shooting assembly is disposed in the first accommodating chamber, and the second image shooting assembly is disposed in the second accommodating chamber. The first image shooting assembly includes a first lens and a first image sensor, where the first image sensor is attached to a first side of the image shooting circuit board, and the first image sensor receives an incident light passing through the first lens for imaging. The second image shooting assembly includes a second lens and a second image sensor, where the second image sensor is attached to a second side of the image shooting circuit board, the second side opposite to the first side, and the second image sensor receives an incident light passing through the second lens for imaging. In this way, the image shooting apparatus provided by this disclosure integrates the first image shooting assembly and second image shooting assembly, and the lenses of the first image shooting assembly and second image shooting assembly are oriented to opposite directions. When applied to a mobile terminal, the first image shooting assembly and second image shooting assembly may be used as a front-facing camera and a rear-facing camera of the mobile terminal respectively. Compared with the manner in the related art where two camera modules are used as a front-facing camera and a rear-facing camera respectively, this reduces space occupied by the front-facing camera and the rear-facing camera in the mobile terminal, improves space utilization of the complete device, and increases stacking flexibility of parts of the complete device on a circuit board.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

Figure 1:
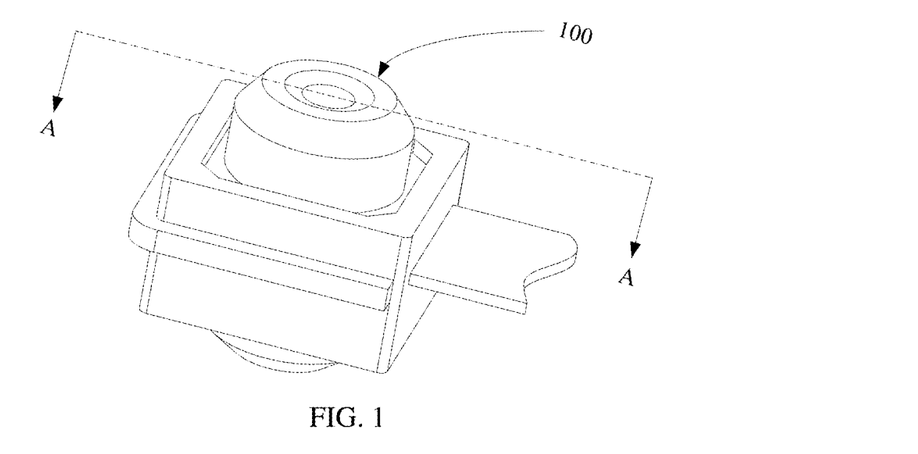
FIG. 1 is a three-dimensional schematic structural diagram of an image shooting apparatus according to an embodiment of this disclosure.
Figure 2:
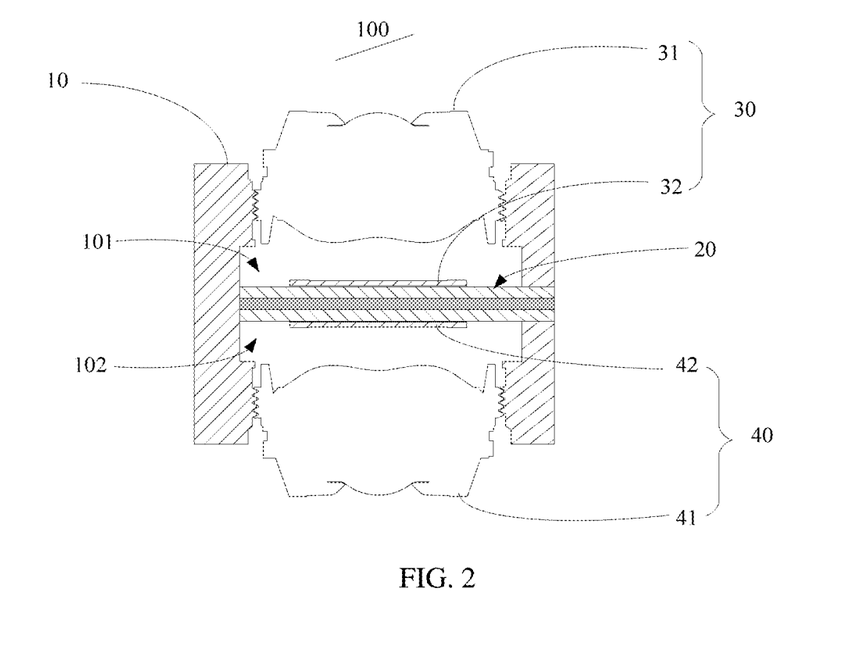
FIG. 2 is a schematic cross-sectional structural diagram of the image shooting apparatus in FIG. 1 along a line A-A.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure. Referring to both FIG. 1 and FIG. 2, FIG. 1 is a three-dimensional schematic structural diagram of an image shooting apparatus 100 according to an embodiment of this disclosure, and FIG. 2 is a schematic cross-sectional structural diagram of the image shooting apparatus 100 in FIG. 1 along a line A-A. As shown in FIG. 1 and FIG. 2, the image shooting apparatus 100 includes a support base 10, an image shooting circuit board 20, a first image shooting assembly 30, and a second image shooting assembly 40. The support base 10 is provided with an accommodating chamber. The image shooting circuit board 20 is disposed in the accommodating chamber, and the image shooting circuit board 20 divides the accommodating chamber into a first accommodating chamber 101 and a second accommodating chamber 102. The first image shooting assembly 30 is disposed in the first accommodating chamber 101, and the second image shooting assembly 40 is disposed in the second accommodating chamber 102.

The first image shooting assembly 30 includes a first lens 31 and a first image sensor 32. The first image sensor 32 is attached to a first side of the image shooting circuit board 20. The first image sensor 32 receives an incident light passing through the first lens 31 for imaging.

The second image shooting assembly 40 includes a second lens 41 and a second image sensor 42. The second image sensor 42 is attached to a second side of the image shooting circuit board 20, where the second side is opposite to the first side. The second image sensor 42 receives an incident light passing through the second lens 41 for imaging.

In the embodiment of this disclosure, the first image shooting assembly 30 and the second image shooting assembly 40 are disposed in the support base 10, and the first image shooting assembly 30 and the second image shooting assembly 40 may be implemented as having opposite shooting directions. Therefore, when the image shooting apparatus 100 is installed on a main circuit board of an electronic device such as a mobile terminal, only one mounting hole fitting with the image shooting apparatus 100 is needed to be provided on the main circuit board. In this way, functions of a front-facing camera and a rear-facing camera of the electronic device can be implemented by the first image shooting assembly 30 and the second image shooting assembly 40. Compared with the manner in the related art where two camera modules are used as a front-facing camera and a rear-facing camera respectively, this reduces space occupied by the front-facing camera and the rear-facing camera in the electronic device, improves space utilization of the complete device, and increases stacking flexibility of parts of the complete device on a circuit board.

The first image shooting assembly and the second image shooting assembly may be in a camera structure that has a fixed focal-length. In this case, the foregoing support base 10 may be a fixed support base that is provided with the foregoing accommodating chamber penetrating therethrough, and the image shooting circuit board 20, the first image shooting assembly 30 and the second image shooting assembly 40 are fixed in the accommodating chamber, such that the first image shooting assembly 30 and the second image shooting assembly 40 may only shoot at a fixed focal length.

Figure 3:
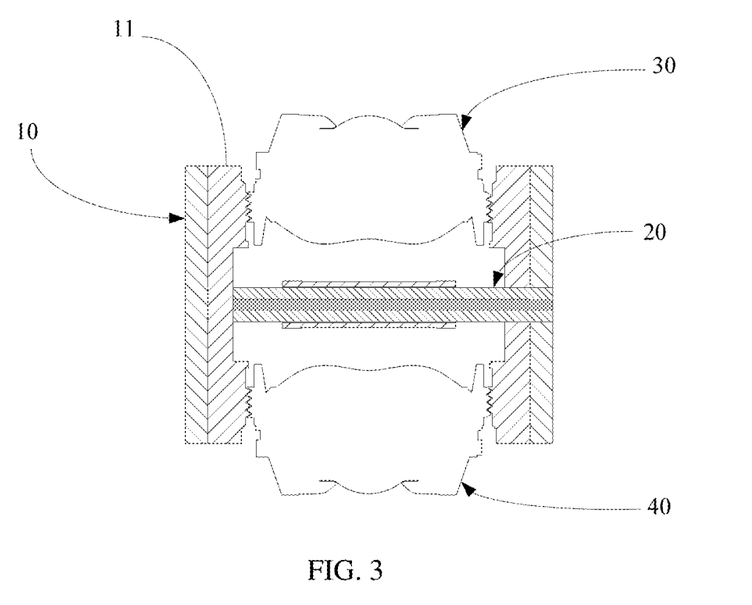
FIG. 3 is a schematic cross-sectional structural diagram of another image shooting apparatus according to an embodiment of this disclosure.

Alternatively, the first image shooting assembly and the second image shooting assembly may be in a zooming-enabled camera structure. As shown in FIG. 3, the image shooting apparatus 100 may further include a first drive motor 11, where the first drive motor 11 is disposed in the accommodating chamber, and the first drive motor 11 is capable of driving the first lens 31 and the second lens 41 to move.

In this embodiment, the first drive motor 11 can simultaneously drive the first image shooting assembly 30 and the second image shooting assembly 40 to move, allowing the first lens 31 and the second lens 41 to perform zoom shooting separately. When the first drive motor 11 drives the first lens 31 and the second lens 41 to move, if the first image shooting assembly 30 is in a shooting mode, a focal length of the first image shooting assembly 30 may be changed; and if the second image shooting assembly 40 is in a shooting mode, the focal length of the second image shooting assembly 40 may be changed. This structure is simple, and helps improve shooting quality. In the above solution, the drive motor of the first lens and the drive motor of the second lens are integrated as one drive motor configured to provide focusing of the two image shooting assemblies. In this way, the integrated drive motor design is beneficial to reduce an overall height of the image shooting apparatus.

Figure 4:
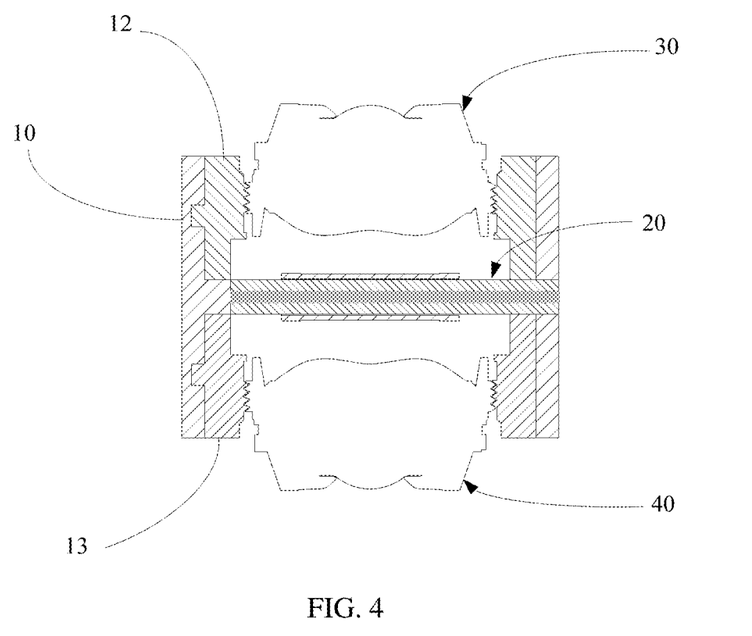
FIG. 4 is a schematic cross-sectional structural diagram of another image shooting apparatus according to an embodiment of this disclosure.

Certainly, in other embodiments, the first image shooting assembly and the second image shooting assembly may each use a different drive motor for focusing. As shown in FIG. 4, the foregoing image shooting apparatus 100 may also include a second drive motor 12 and/or a third drive motor 13, where the second drive motor 12 is disposed in the first accommodating chamber 101, where the second drive motor 12 is capable of driving the first lens 31 to move;

and the third drive motor 13 is disposed in the second accommodating chamber 102, where the third drive motor 13 is capable of driving the second lens 41 to move.

When the first image shooting assembly 30 is in shooting mode, the second drive motor 12 is capable of driving the first lens 31 to move, such that the focal length of the first image shooting assembly 30 may be changed during shooting. When the second image shooting assembly 40 is in shooting mode, the third drive motor 13 is capable of driving the second lens 41 to move, such that the focal length of the second image shooting assembly 40 may be changed during shooting. As such, the first image shooting assembly 30 and the second image shooting assembly 40 may perform focusing by using the two drive motors respectively, which enables easy and highly reliable focusing.

It should be noted that in the foregoing image shooting apparatus 100, it is possible that only the first image shooting assembly 30 or only the second image shooting assembly 40 has a focusing function. If only the first image shooting assembly 30 has the focusing function, the image shooting apparatus 100 is provided with only the second drive motor 12. If only the second image shooting assembly 40 has the focusing function, the image shooting apparatus 100 is provided with only the third drive motor 13. Certainly, it is also possible that both the first image shooting assembly 30 and the second image shooting assembly 40 have the focusing function, which means that both the second drive motor 12 and the third drive motor 13 are provided in the image shooting apparatus 100.

In addition, when the image shooting apparatus 100 is provided with the second drive motor 12, the image shooting apparatus 100 may also be provided with the first drive motor 11, where the first drive motor 11 drives the second lens 41 to move, and together with the second drive motor 12, drives the first lens 31 to move. Similarly, the foregoing image shooting apparatus 100 may be provided with both the first drive motor 11 and the third drive motor 13, or even all of the first drive motor 11, the second drive motor 12 and the third drive motor 13. This is not limited herein.

In an embodiment of this disclosure, the foregoing image shooting circuit board 20 is configured to carry the first image sensor 32 and the second image sensor 42. The image shooting circuit board 20 is connected to a main circuit board of the electronic device. Wires on the image shooting circuit board 20 may transmit signals of the first image sensor 32 and the second image sensor 42 to other elements (such as a processor) on the main circuit board of the electronic device.

Figure 5:
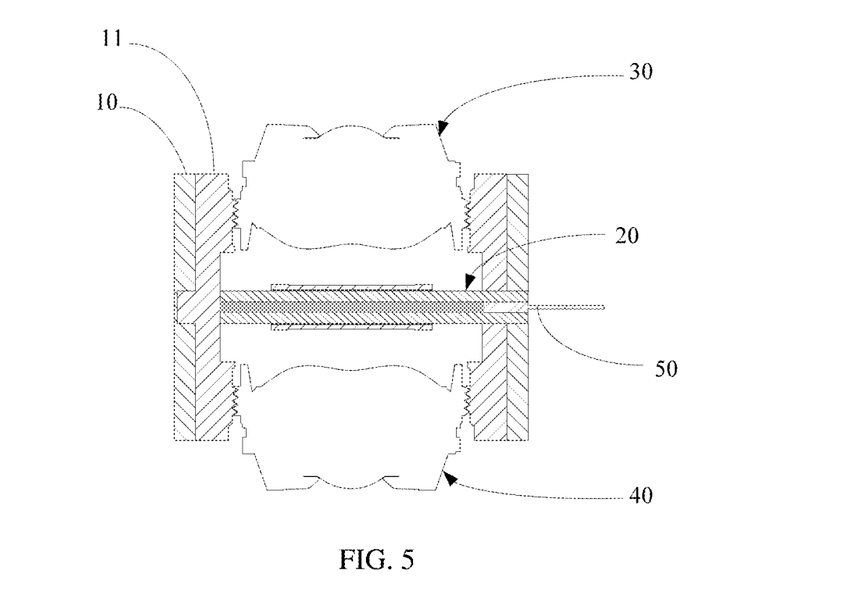
FIG. 5 is a schematic cross-sectional structural diagram of another image shooting apparatus according to an embodiment of this disclosure.

The image shooting circuit board 20 is connected to the main circuit board of the electronic device. As shown in FIG. 5, it is possible that the foregoing image shooting apparatus 100 further includes a connecting circuit board 50, where the connecting circuit board 50 is connected to the image shooting circuit board 20 by passing through a side wall of the support base 10. The image shooting circuit board 20 is electrically connected to an external circuit through the connecting circuit board 50, thereby reducing installation difficulty and providing a stable and reliable connection between the image shooting circuit board 20 and the external circuit.

That the connecting circuit board 50 is connected to the image shooting circuit board 20 by passing through a side wall of the support base 10 may be implemented by making a through-hole into the side wall of the support base 10 for the connecting circuit board 50 to pass through. This is not limited herein.

It should be noted that the connecting circuit board 50 may be any circuit board, provided that it provides an electrical connection between the image shooting circuit board 20 and the external circuit. For example, the connecting circuit board 50 may be a flexible printed circuit (Flexible Printed Circuit, FPC) board that has advantages such as a small thickness and good bendability, such that the connection between the image shooting circuit board 20 and the external circuit is more stable and reliable.

The image shooting circuit board 20 may transmit an electrical signal of the first image shooting assembly 30 and an electrical signal of the second image shooting assembly 40 to the main circuit board through the connecting circuit board 50, and the connecting circuit board 50 needs to be provided with wires for transmitting the electrical signal of the first image shooting assembly 30 and the electrical signal of the second image shooting circuit 40. As such, in order that the connecting circuit board 50 would not become too wide due to the wiring, the connecting circuit board 50 can be implemented as a double-layer or multilayer FPC.

Figure 6:
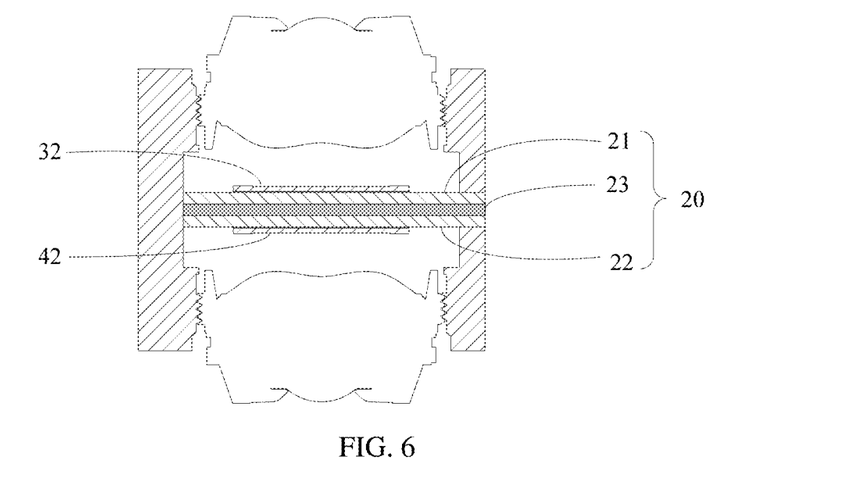
FIG. 6 is a schematic cross-sectional structural diagram of another image shooting apparatus according to an embodiment of this disclosure.

In addition, the image shooting circuit board 20 may alternatively be any circuit board that can carry the first image sensor 32 and the second image sensor 42, and transmit the electrical signal of the first image sensor 32 and the electrical signal of the second image sensor 42. As shown in FIG. 6, the image shooting circuit board 20 may also include a first circuit board 21, a second circuit board 22, and a heat conducting layer 23. The first image sensor 32 is attached to the first circuit board 21. The second image sensor 42 is attached to the second circuit board 22. The heat conducting layer 23 is disposed between the first circuit board 21 and the second circuit board 22. The first circuit board 21 may be used to carry the first image sensor 32 and transmit the electrical signal of the first image sensor 32 through, and the second circuit board 22 may be used to carry the second image sensor 42 and transmit the electrical signal of the second image sensor 42.

It should be noted that disposing the heat conducting layer 23 (for example, a high-performance heat dissipation material such as heat conducting silica gel or graphite or copper foil) between the first circuit board 21 and the second circuit board 22 can improve a heat dissipation performance of the image shooting circuit board 20, and improve a service life of the image shooting apparatus 100.

In the above solution, the image shooting circuit board 20 is implemented by using two circuit boards (namely, the first circuit board 21 and the second circuit board 22). Certainly, the image shooting circuit board 20 may alternatively be implemented by using one circuit board. In this case, the image shooting circuit board 20 may be a double-layer or multilayer circuit board, and a plurality of copper layers are provided in the multilayer circuit board. In this way, compared with the foregoing manner of implementing the image shooting circuit board as two circuit boards, implementing the image shooting circuit board as one circuit board saves one layer of circuit board and a gap between the two circuit boards, which further reduces the thickness of the image shooting circuit board 20, making the entire image shooting apparatus more compact, further reducing the installation space occupied by the image shooting apparatus 100 in the electronic device, and improving the practicability and adaptability of the entire image shooting apparatus. In addition, with the plurality of copper layers provided in the multilayer circuit board, heat conducting performance of the image shooting circuit board 20 can be improved.

In an embodiment of this disclosure, the first lens 31 and the second lens 41 are disposed on two sides of the image shooting circuit board 20 respectively, which may be that the first lens 31 and the second lens 41 are arranged to be exactly opposite to each other on the two sides of the image shooting circuit board 20, thereby further reducing the installation space on the main circuit board of the electronic device occupied by the image shooting apparatus 100.

Figure 7A:
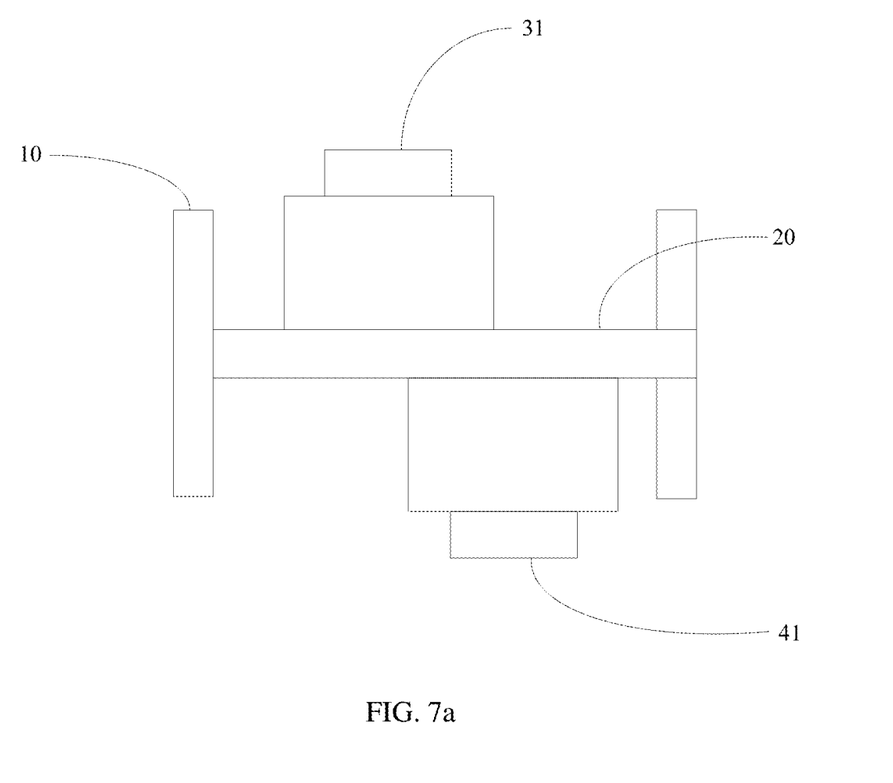
FIG. 7a is a schematic structural diagram of another image shooting apparatus according to an embodiment of this disclosure.
Figure 7B:
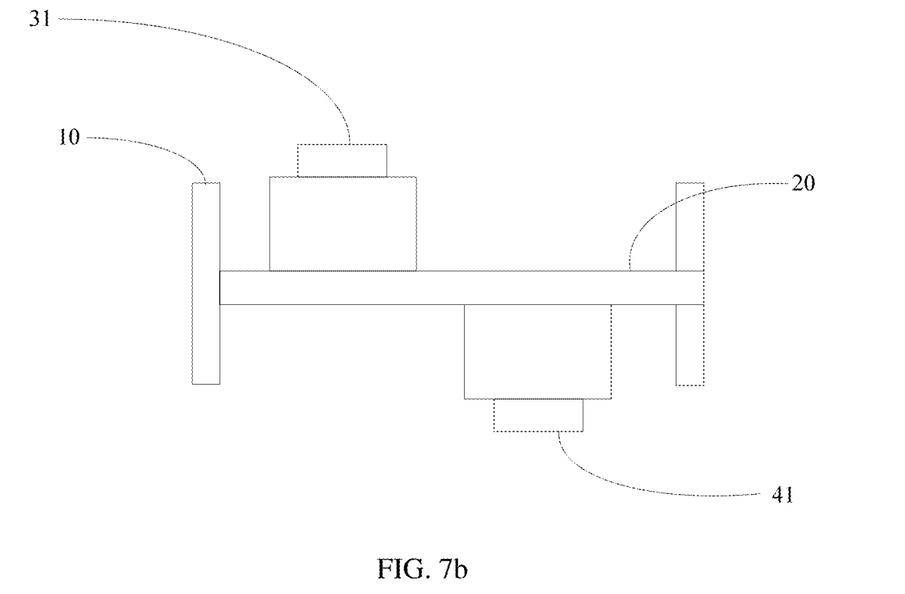
FIG. 7b is a schematic structural diagram of another image shooting apparatus according to an embodiment of this disclosure.

Certainly, as shown in FIG. 7*a* and FIG. 7*b*, the first lens 31 and the second lens 41 may alternatively be arranged alternately on two sides of the image shooting circuit board 20, such that the first lens 31 and the second lens 41 are distributed more flexibly.

It should be noted that when the first lens 31 and the second lens 41 are disposed alternately, the foregoing first lens 31 and the second lens 41 may both be disposed in one drive motor, such that the first image shooting assembly 30 and the second image shooting assembly 40 may perform focusing separately. Alternatively, the first lens 31 and the second lens 41 may be disposed each in a separate drive motor, such that the first image shooting assembly 30 and the second camera assembly 40 may perform focusing by using the two drive motors respectively. Alternatively, the support base 10 may include only one drive motor, and the first lens 31 or the second lens 41 is disposed in the drive motor, such that one of the first image shooting assembly 30 and the second image shooting assembly 40 may perform focusing during shooting, while the other has a fixed focal length during shooting. This is not limited herein.

Figure 8:
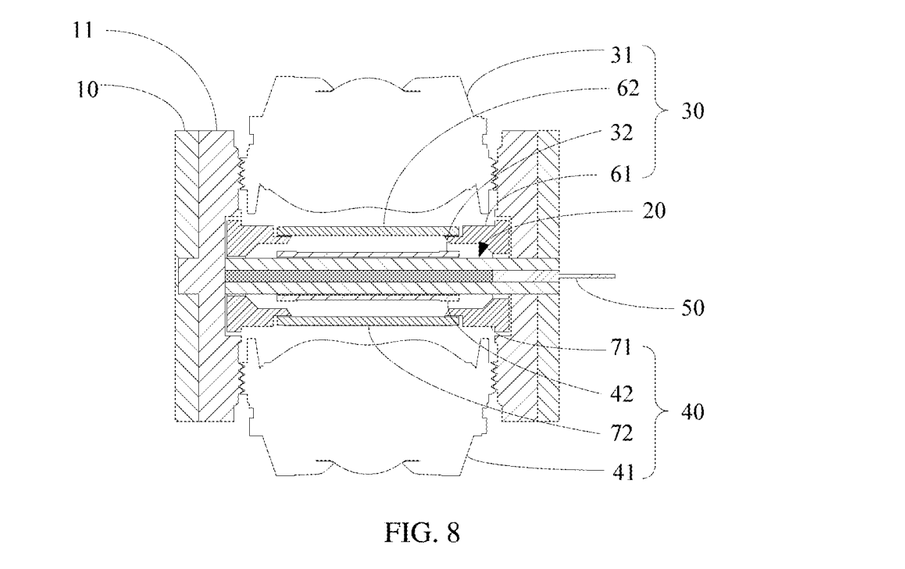
FIG. 8 is a schematic cross-sectional structural diagram of another image shooting apparatus according to an embodiment of this disclosure.

In an embodiment of this disclosure, in order to improve shooting quality of the first image shooting assembly 30 and the second image shooting assembly 40, as shown in FIG. 8, the first image shooting assembly 30 may further include a first light filter support 61 and a first light filter 62, where the first light filter support 61 is disposed between the first lens 31 and the image shooting circuit board 20, and the first light filter support 61 supports the first light filter 62. An incident light received by the first lens 31 is transmitted to the first image sensor 32 through the first light filter 62. In addition, the second image shooting assembly 40 further includes a second light filter support 71 and a second light filter 72, where the light filter support 71 is disposed between the second lens 41 and the image shooting circuit board 20, and the second light filter support 71 supports the second light filter 72. An incident light received by the second lens 41 is transmitted to the second image sensor 42 through the second light filter 72. As such, quality of an image shot by the first image shooting assembly 30 may be improved through the first light filter 62, and quality of an image shot by the second image shooting assembly 40 may be improved by the second light filter 72.

Certainly, in the foregoing image shooting apparatus 100, alternatively, it is possible that the first light filter support 61 and the first light filter 62 are provided in the first image shooting assembly 30, while the second light filter support 71 and the second light filter 72 are not provided in the second image shooting assembly 40; or that the second light filter support 71 and the second light filter 72 are provided in the second image shooting assembly 40, while the first light filter support 61 and the first light filter 62 are not provided in the first image shooting assembly 30. This is not limited herein.

Figure 9A:
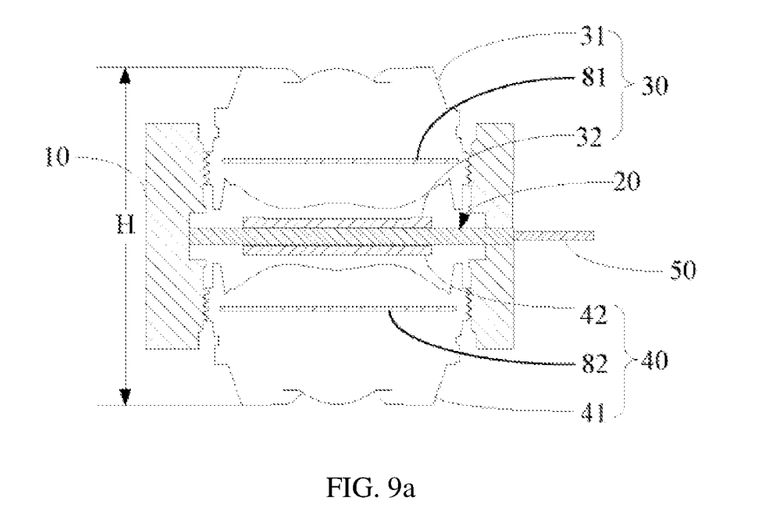
FIG. 9a is a schematic cross-sectional structural diagram of another image shooting apparatus according to an embodiment of this disclosure.

In addition, as shown in FIG. 9*a*, the first image shooting assembly 30 may further include a third light filter 81, where the third light filter 81 is disposed in the first lens 31, and an incident light received by the first lens 31 is transmitted to the first image sensor 32 through the third light filter 81. In addition, the second image shooting assembly 40 may further include a fourth light filter 82, where the fourth light filter 82 is disposed in the second lens 41, and an incident light received by the second lens 41 is transmitted to the second image sensor 42 through the fourth light filter 82. In this way, not only quality of an image shot by the first image shooting assembly 30 can be improved through the third light filter 81, and quality of the image shot by the second image shooting assembly 40 can be improved by the fourth light filter 82, but also, as the third light filter 81 is disposed in the first lens 31, the third light filter 81 does not occupy space between the first lens 31 and the first image sensor 32, which can reduce a gap between the first lens 31 and the first image sensor 32 and reduce a volume of the first image shooting assembly 30, thereby significantly reducing a thickness H of the image shooting apparatus 100. Similarly, disposing the fourth light filter 82 in the second lens 41 can also reduce a gap between the second lens 41 and the second image sensor 42, thereby reducing the thickness of the image shooting apparatus 100, and further reducing the installation space occupied by the image shooting apparatus 100 in the electronic device.

In addition, as integrating a light filter into a lens is a processing scheme well known in the art, this method can also reduce complexity in designing the image shooting assemblies, reduce development difficulty, improve product yield rate, and save production cost.

It should be noted that, alternatively, in the image shooting apparatus 100, it is possible that the third light filter 81 is provided in the first image shooting assembly 30, while the fourth light filter 82 is not provided in the second image shooting assembly 40; or that the fourth light filter 82 is provided in the second image shooting assembly 40, while the third light filter 81 is not provided in the first image shooting assembly 30. This can also reduce the thickness H of the image shooting apparatus 100 to some extent, thereby reducing the installation space occupied by the image shooting apparatus 100 in electronic device.

Figure 9B:
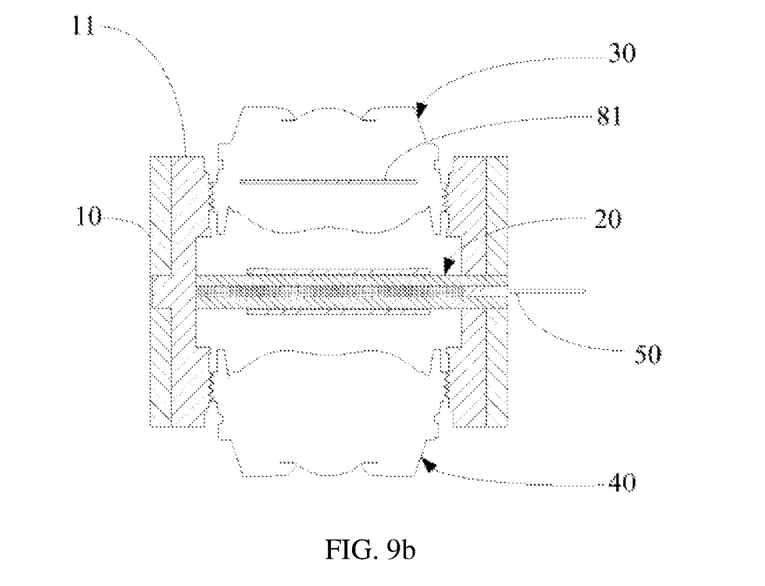
FIG. 9b is a schematic cross-sectional structural diagram of another image shooting apparatus according to an embodiment of this disclosure.

For example, if only the first image shooting assembly 30 (which may be a front-facing camera) is required to provide an infrared face recognition function, it is possible only providing the third light filter 81 in the first lens 31, and the third light filter 81 may filter out colored light other than red light, as shown in FIG. 9*b*. Certainly, similarly, if only the second image shooting assembly 40 (which may be a rear-facing camera) is required to provide an infrared face recognition function, a light filter that filters out colored light other than infrared light may be provided in the second lens 41.

The image shooting apparatus 100 according to the embodiments of this disclosure includes: a support base, an image shooting circuit board, a first image shooting assembly, and a second image shooting assembly. The support base is provided with an accommodating chamber. The image shooting circuit board is disposed in the accommodating chamber, and the image shooting circuit board divides the accommodating chamber into a first accommodating chamber and a second accommodating chamber. The first image shooting assembly is disposed in the first accommodating chamber, and the second image shooting assembly is disposed in the second accommodating chamber. The first image shooting assembly includes a first lens and a first image sensor, where the first image sensor is attached to a first side of the image shooting circuit board, and the first image sensor receives an incident light passing through the first lens for imaging. The second image shooting assembly includes a second lens and a second image sensor. The second image sensor is attached to a second side of the image shooting circuit board, the second side opposite to the first side, and the second image sensor receives an incident light passing through the second lens for imaging. In this way, the image shooting apparatus provided by this disclosure integrates the first image shooting assembly and second image shooting assembly, and the lenses of the first image shooting assembly and second image shooting assembly are oriented to opposite directions. When applied to a mobile terminal, the first image shooting assembly and second image shooting assembly may be used as a front-facing camera and a rear-facing camera of the mobile terminal respectively. Compared with the manner in the related art where two camera modules are used as a front-facing camera and a rear-facing camera respectively, this reduces space occupied by the front-facing camera and the rear-facing camera in the mobile terminal, improves space utilization of the complete device, and increases stacking flexibility of parts of the complete device on a circuit board.

Based on the foregoing image shooting apparatus 100, an embodiment of this disclosure further provides a mobile terminal, including the foregoing image shooting apparatus 100.

Since structuring of the mobile terminal body is a related art, and the image shooting apparatus 100 has been described in detail in the foregoing embodiments, the specific structure of the mobile terminal is not described in detail in this embodiment.

In this embodiment of this disclosure, the mobile terminal may be any mobile terminal provided with the foregoing image shooting apparatus 100, for example, a mobile phone, a tablet computer (Tablet Personal Computer), a laptop computer (Laptop Computer), a personal digital assistant (personal digital assistant, PDA), a mobile internet device (Mobile Internet Device, MID), or a wearable device (Wearable Device).

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An image shooting apparatus, comprising a support base, an image shooting circuit board, a first image shooting assembly, and a second image shooting assembly, wherein the support base is provided with an accommodating chamber; the image shooting circuit board is disposed in the accommodating chamber, and the image shooting circuit board divides the accommodating chamber into a first accommodating chamber and a second accommodating chamber; the first image shooting assembly is disposed in the first accommodating chamber, and the second image shooting assembly is disposed in the second accommodating chamber;

the first image shooting assembly comprises a first lens and a first image sensor, wherein the first image sensor is attached to a first side of the image shooting circuit board, and the first image sensor receives an incident light passing through the first lens for imaging; and the second image shooting assembly comprises a second lens and a second image sensor, wherein the second image sensor is attached to a second side of the image shooting circuit board, the second side opposite to the first side, and the second image sensor receives an incident light passing through the second lens for imaging;

wherein the image shooting circuit board comprises a first circuit board, a second circuit board, and a heat conducting layer; the first image sensor is attached to the first circuit board; the second image sensor is attached to the second circuit board; and the heat conducting layer is disposed between the first circuit board and the second circuit board; wherein the first circuit board, the second circuit board and the heat conducting layer are each of a single-layer structure;

wherein the heat conducting layer is in direct contact with both the first circuit board and the second circuit board;

wherein an orthogonal projection of the heat conducting layer onto the second circuit board fully covers an orthogonal projection of the first circuit board onto the second circuit board, and an orthogonal projection of the heat conducting layer onto the first circuit board fully covers an orthogonal projection of the second circuit board onto the first circuit board;

wherein the image shooting apparatus further comprises a connecting circuit board, wherein the connecting circuit board is connected to the image shooting circuit board by passing through a side wall of the support base, and the image shooting circuit board is electrically connected to an external circuit through the connecting circuit board; wherein the connecting circuit board is a double-layer or multilayer flexible circuit board;

wherein the first lens and the second lens are alternately arranged on two sides of the image shooting circuit board, and the image shooting apparatus further comprises a second drive motor and a third drive motor, wherein the second drive motor is disposed in the first accommodating chamber, and the second drive motor is capable of driving the first lens to move; and the third drive motor is disposed in the second accommodating chamber, and the third drive motor is capable of driving the second lens to move.

2. The image shooting apparatus according to claim 1, wherein the first image shooting assembly further comprises a first light filter support and a first light filter, wherein the first light filter support is disposed between the first lens and the image shooting circuit board, the first light filter support supports the first light filter, and the incident light received by the first lens is transmitted to the first image sensor through the first light filter; and/or the second image shooting assembly further comprises a second light filter support and a second light filter, wherein the second light filter support is disposed between the second lens and the image shooting circuit board, the second light filter support supports the second light filter, and the incident light received by the second lens is transmitted to the second image sensor through the second light filter.

3. The image shooting apparatus according to claim 1, wherein the first image shooting assembly further comprises a third light filter, wherein the third light filter is disposed within the first lens, and the incident light received by the first lens is transmitted to the first image sensor through the third light filter; and/or the second image shooting assembly further comprises a fourth light filter, wherein the fourth light filter is disposed within the second lens, and the incident light received by the second lens is transmitted to the second image sensor through the fourth light filter.

4. A mobile terminal, comprising an image shooting apparatus, wherein the image shooting apparatus comprises a support base, an image shooting circuit board, a first image shooting assembly, and a second image shooting assembly, wherein the support base is provided with an accommodating chamber; the image shooting circuit board is disposed in the accommodating chamber, and the image shooting circuit board divides the accommodating chamber into a first accommodating chamber and a second accommodating chamber; the first image shooting assembly is disposed in the first accommodating chamber, and the second image shooting assembly is disposed in the second accommodating chamber;

the first image shooting assembly comprises a first lens and a first image sensor, wherein the first image sensor is attached to a first side of the image shooting circuit board, and the first image sensor receives an incident light passing through the first lens for imaging; and the second image shooting assembly comprises a second lens and a second image sensor, wherein the second image sensor is attached to a second side of the image shooting circuit board, the second side opposite to the first side, and the second image sensor receives an incident light passing through the second lens for imaging;

wherein the image shooting circuit board comprises a first circuit board, a second circuit board, and a heat conducting layer; the first image sensor is attached to the first circuit board; the second image sensor is attached to the second circuit board; and the heat conducting layer is disposed between the first circuit board and the second circuit board; wherein the first circuit board, the second circuit board and the heat conducting layer are each of a single-layer structure;

wherein the heat conducting layer is in direct contact with both the first circuit board and the second circuit board;

wherein an orthogonal projection of the heat conducting layer onto the second circuit board fully covers an orthogonal projection of the first circuit board onto the second circuit board, and an orthogonal projection of the heat conducting layer onto the first circuit board fully covers an orthogonal projection of the second circuit board onto the first circuit board;

wherein the image shooting apparatus further comprises a connecting circuit board, wherein the connecting circuit board is connected to the image shooting circuit board by passing through a side wall of the support base, and the image shooting circuit board is electrically connected to an external circuit through the connecting circuit board; wherein the connecting circuit board is a double-layer or multilayer flexible circuit board;

wherein the first lens and the second lens are alternately arranged on two sides of the image shooting circuit board, and the image shooting apparatus further comprises a second drive motor and a third drive motor, wherein the second drive motor is disposed in the first accommodating chamber, and the second drive motor is capable of driving the first lens to move; and the third drive motor is disposed in the second accommodating chamber, and the third drive motor is capable of driving the second lens to move.

5. The image shooting apparatus according to claim 4, wherein the first image shooting assembly further comprises a first light filter support and a first light filter, wherein the first light filter support is disposed between the first lens and the image shooting circuit board, the first light filter support supports the first light filter, and the incident light received by the first lens is transmitted to the first image sensor through the first light filter; and/or the second image shooting assembly further comprises a second light filter support and a second light filter, wherein the second light filter support is disposed between the second lens and the image shooting circuit board, the second light filter support supports the second light filter, and the incident light received by the second lens is transmitted to the second image sensor through the second light filter.

6. The image shooting apparatus according to claim 4, wherein the first image shooting assembly further comprises a third light filter, wherein the third light filter is disposed within the first lens, and the incident light received by the first lens is transmitted to the first image sensor through the third light filter; and/or the second image shooting assembly further comprises a fourth light filter, wherein the fourth light filter is disposed within the second lens, and the incident light received by the second lens is transmitted to the second image sensor through the fourth light filter.

* * * * *